(12) United States Patent
Chen

(10) Patent No.: US 7,682,174 B2
(45) Date of Patent: Mar. 23, 2010

(54) ELECTRICAL CARD CONNECTOR

(75) Inventor: Ming-Ching Chen, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/229,823

(22) Filed: Aug. 26, 2008

(65) Prior Publication Data

US 2009/0061670 A1     Mar. 5, 2009

(30) Foreign Application Priority Data

Aug. 28, 2007   (CN)   ........................... 200720045582

(51) Int. Cl.
*H01R 29/00*   (2006.01)
(52) U.S. Cl. ..................................... 439/188
(58) Field of Classification Search .................. 439/188
See application file for complete search history.

(56) References Cited

U.S. PATENT DOCUMENTS

| | | | |
|---|---|---|---|
| 6,045,049 A * | 4/2000 | Nishimura et al. | 235/486 |
| 2006/0116027 A1 * | 6/2006 | Tseng et al. | 439/630 |
| 2008/0090437 A1 * | 4/2008 | Huang et al. | 439/188 |

* cited by examiner

*Primary Examiner*—Ross N Gushi
(74) *Attorney, Agent, or Firm*—Ming Chieh Chang; Wei Te Chung; Andrew C. Cheng

(57) ABSTRACT

An electrical card connector for receiving a card, comprises an insulative housing having a supporting surface with a front end and a rear end; a plurality of contacts assembled in the housing and oriented toward the rear end; a switch terminal arranged in the rear end. Each contact has at least a contact engaging portion extending above the supporting surface; one of the contact engaging portions engaged with the switch terminal when a card is inserted, and electrically separated from each other when the card is removed.

12 Claims, 4 Drawing Sheets

ELECTRICAL CARD CONNECTOR

BACKGROUND OF THE INVENTION

1. Field of the Invention

The present invention relates to an electrical card connector, and particularly to an electrical card connector used with detecting function.

2. Description of the Prior Art

IC (integrated circuit) cards are known in the art and contain artificial intelligence in the form of a memory circuit or other electronic program. A card reader is used to read the information or retrieve the memory stored on the card. IC cards are used in countless applications today, including video cameras, smart-phones, music players, ATMs, cable television decoders, toys, games, pc adapters and other electronic applications.

A typical card connector is described in China Patent CN 2854856Y, hereinafter referred to as the '856 patent. The card connector disclosed in this issue connection, The '856 patent discloses a card connector body comprising an insulating housing with a receiving slot for receiving a card, a plurality of contacts mounted on the housing, a pair of switch contacts mounted on one side of the housing and protruding to the receiving slot, and a metal shell for covering the housing. The switch contacts separate from each other without a card inserted into the receiving slot, and contact with each other when a card inserted into the slot and one side thereof pushing one switch contact touch with the other for noticing that a card is inserted.

However, at least one problem of above said card connector is that the switch comprises two switch contacts mounted on one side of the housing, the processes of the switch contacts manufacture and assembly increase the production cost of the connector; and further the size of the connector increases obviously, so such connector would not be in accord with the miniaturization trend of the electrical device.

Hence, an improved electrical card connector is desired to overcome the disadvantages of the prior art.

BRIEF SUMMARY OF THE INVENTION

Therefore, a main object of the present invention is to provide an electrical card connector which could be in accord with the miniaturization trend, and reduce the production cost of the connector.

To fulfill the above-mentioned object, an electrical card connector for receiving a card, comprises an insulative housing having a supporting surface with a front end and a rear end; a plurality of contacts assembled in the housing and oriented toward the rear end; a switch terminal arranged in the rear end. Each contact has at least a contact engaging portion extending above the supporting surface; one of the contact engaging portions engaged with the switch terminal when a card is inserted, and electrically separated from each other when the card is removed.

Other objects, advantages and novel features of the invention will become more apparent from the following detailed description when taken in conjunction with the accompanying drawings.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE PREFERRED EMBODIMENT

Reference will now be made in detail to the preferred embodiment of the present invention.

Figure 1:
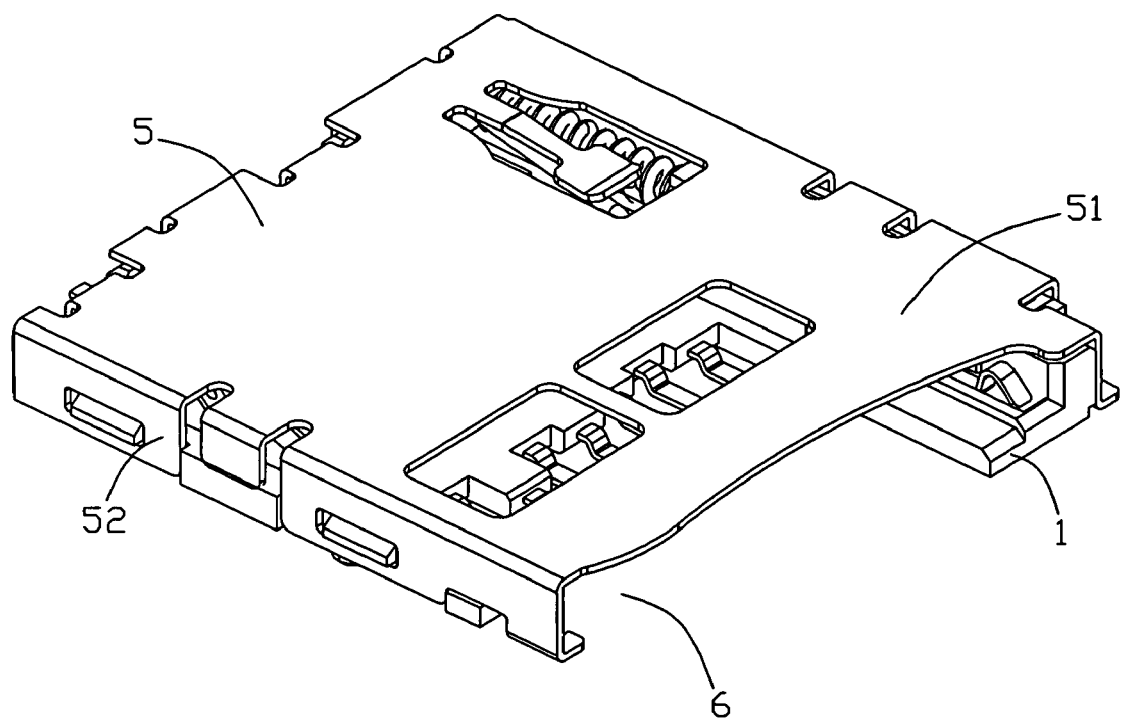
FIG. 1 is a perspective view of an electrical connector to a first embodiment of the present invention.
Figure 2:
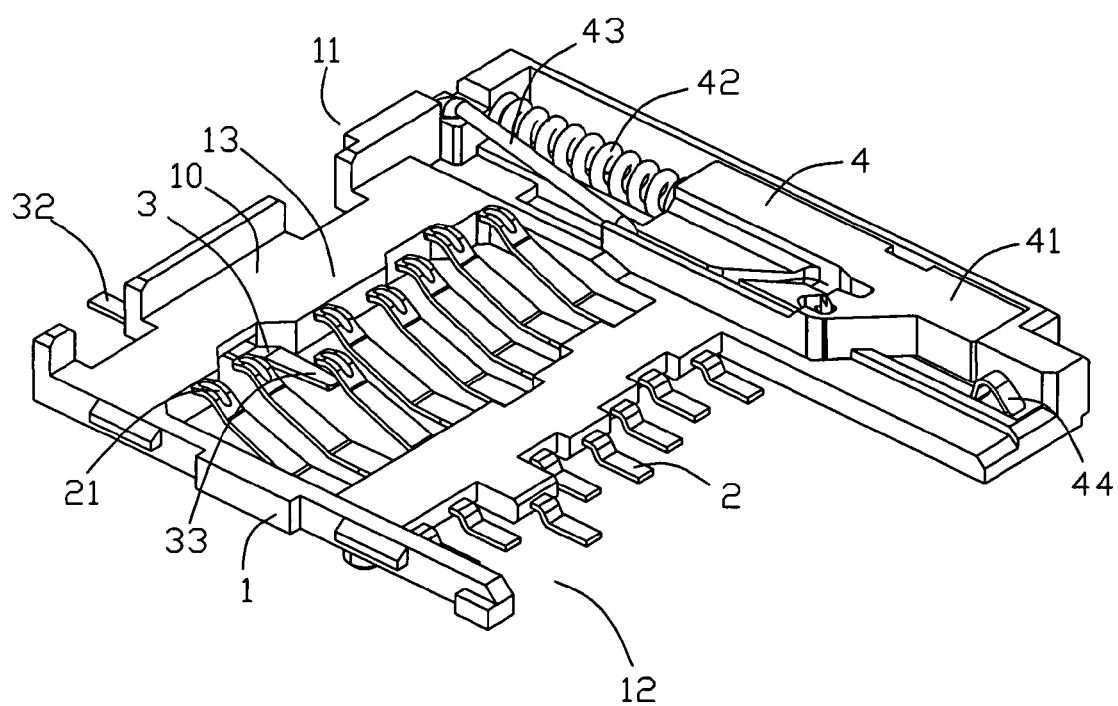
FIG. 2 is a perspective view of an electrical connector of FIG. 1 without the shielding case.

Referring to FIGS. 1-2, an electrical card connector according to a first embodiment of the present invention is adapted for receiving an electronic card (not shown). The electrical card connector comprises an insulating housing 1 defining a receiving room, a plurality of contacts 2 mounted in the housing 1, a switch terminal 3 mounted on the housing 1 corresponding to one contact 2, a ejector 4 moveably mounted in one side of the housing 1, and a shielding case 5 covering the housing 1.

The housing 1 comprises a rear end 11 and a front end 12 having an opening 6 for inserting an electronic card therefrom, the receiving room 10 extending from the opening 6 towards the rear end 11, and the housing 1 has a footwall 13 below the receiving room 10.

Each contact 2 assembled to the corresponding passage (not shown), comprises a first contact portion 21 extending toward the rear end 11 and protruding into the receiving room 10, for electrically connecting the corresponding contact pad (not shown) of the card inserted into the receiving room 10.

The ejector 4 mounted on one side of the receiving room 10, comprises a slider 41 with a cam follower (not shown) on the top surface, a pin member 43 having one end moveably mounted in the cam follower and the other end fixed in a preinstall position (not shown) of the rear end 11 of the housing 1, a spring 42 sandwiched between the slider 41 and the rear end 11 of the housing 1, and a fastening member 44 mounted on the slider 41 and protruding into the receiving room 10. In the process of inserting the card into the receiving room 10, the card push the slider 41 slide toward the rear end 11, and the spring 42 become compressed; then the card is engaging with the fastening member 44 so as to be fastened to the ejector 4, finally, the pin member 43 is locked in a locking groove (not shown) of the cam follower and the card is at an operating position. In the process of ejecting the card out of the receiving room is: just continue to push the card toward the rear end 11, and the end of the pin member 43 will pop out of the locking groove of the cam follower; then release the card, the compressed spring 42 push the slider 41 toward the front end 12, accordingly, the card is pushed out of the receiving room.

The shielding case 5 is approximately rectangular, and comprises a top wall 51 above the receiving room, and a pair of side walls 52 extending from the opposite side of the top wall 51 perpendicularly and downwardly.

The switch terminal 3 is mounted on the rear end 11 of the housing 1, correspond to one contact 2 to form a switch together. The switch 3 comprises an assembling portion (not shown) assembled to the rear end 11 of the housing 1, a soldering portion 32 extending from one end of the assembling portion and protruding out of the housing, and a second contacting portion 33 extending from the other end of the assembling portion and protruding into the receiving room 10, under the first contact portion 21 of the corresponding contact 2. The first contact portion 21 is separate from the second contact portion 33 without a card inserted in the receiving room 10; and the first contact portion 21 touch the second portion 33 when a card is inserted in the receiving room 10, so as to inform the circuit that the card is at functional mode.

Figure 3:
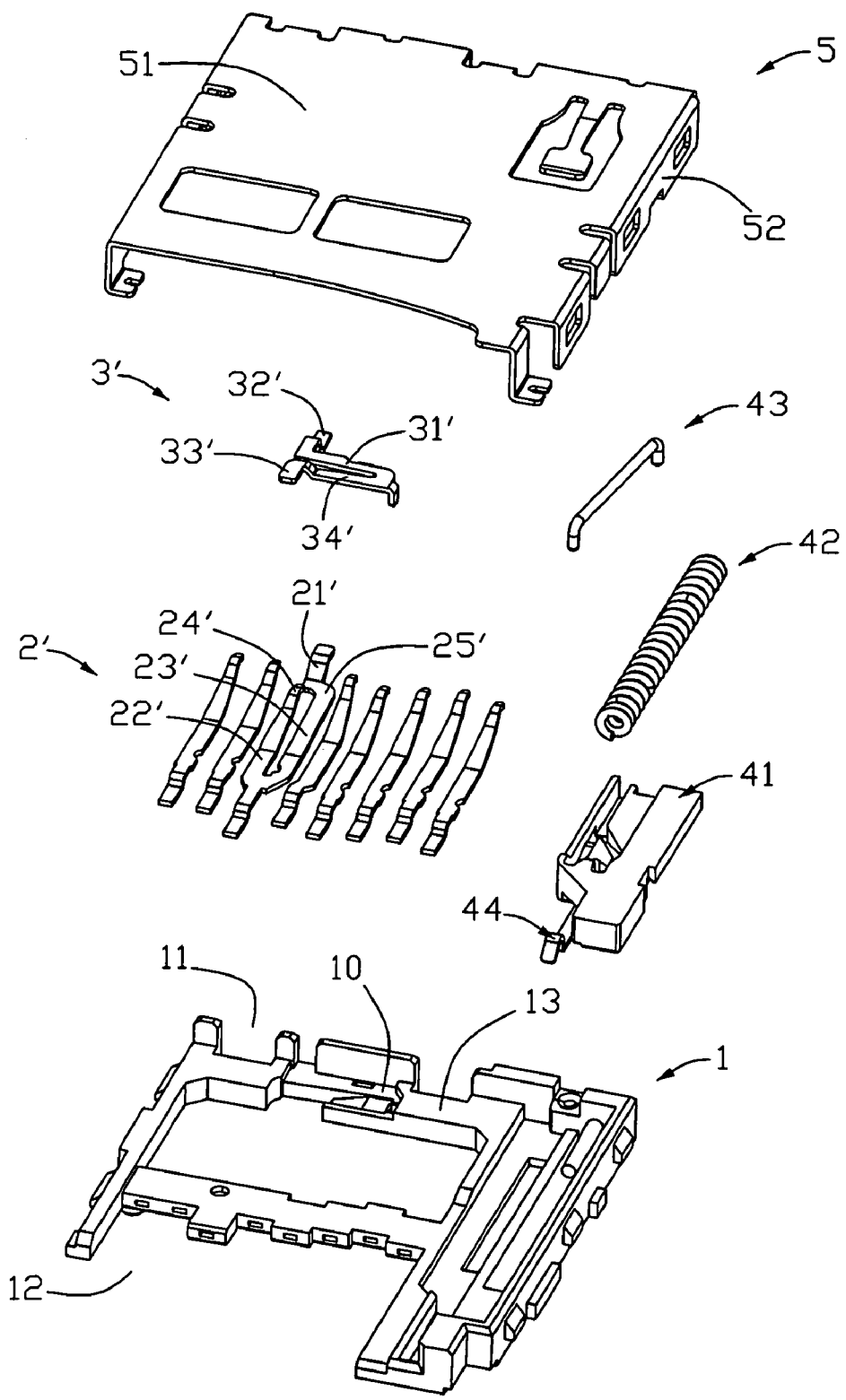
FIG. 3 is an exploded perspective view of an electrical connector to a second embodiment of the present invention.
Figure 4:
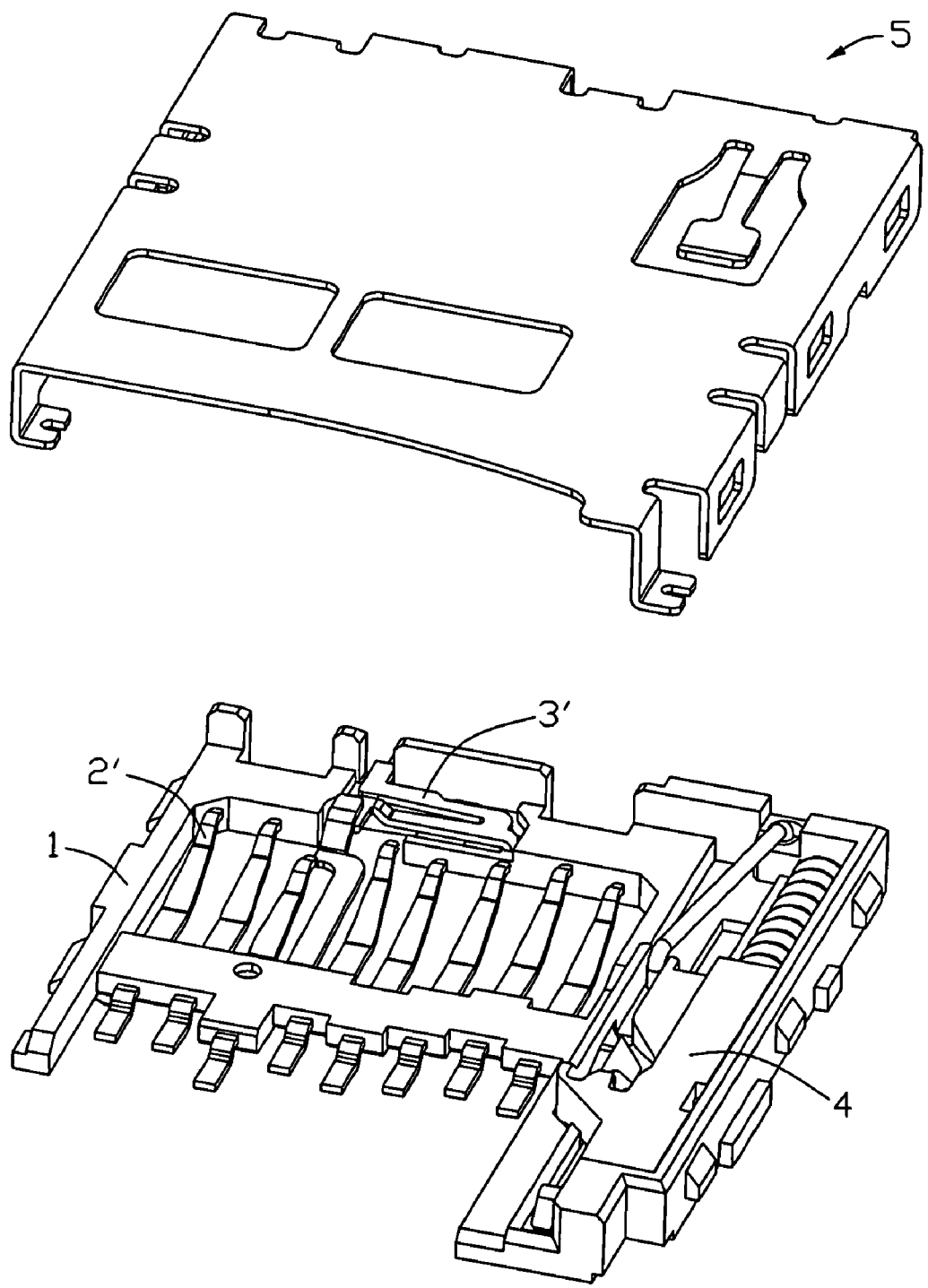
FIG. 4 is a perspective view of an electrical connector of FIG. 3 without the shielding case.

FIGS. 3-4 disclose a second embodiment of the present invention, the switch is separate from the first embodiment. In this embodiment, the switch comprises a switch terminal 3' and one corresponding contact 2'. The switch terminal 3' comprises an assembling portion 31' assembled onto the footwall 13 and adjacent to the rear end 11 of the housing 1, a soldering portion 32' extending from one end of the assembling portion 31' perpendicularly and protruding out of the rear end 11 of the housing 1, a spring arm 34' connecting to the other end of the assembling portion 31' and approximately runs parallel with the assembling portion 31'; and a second contact portion 33' extending from the free end of the spring arm 34' perpendicularly and horizontally. The contact 2' corresponding to the switch terminal 3' comprises a mounting portion (not shown) assembled on the housing 1, a first elastic arm 22' and a second elastic arm 23' extending approximately parallelly from the same end of the mounting portion, a third contact portion 24' formed on the free end of the first elastic arm 22' for electrically connecting the contact pad of the card, a connecting portion 25' extending from the free end of the second elastic arm 23' toward the first arm 22', a first contacting portion 21' extending from the one side of the free end of the contact portion 24' toward the rear end 11 above the second contact portion 33'. The first contact portion 21' is separate from the second contact portion 33' without a card inserted into the receiving room 10; and the first contact portion 21' touch the second contact portion 33', the third contact portion 24' electrically connecting the contact pad of the card when a card is inserted in the receiving room 10, so as to inform the circuit that the card is at functional mode.

In the present invention, the switch 3, 3' and the corresponding contact 2, 2' together to form a detect switch. Compare to the related arts, the connector of the present invention could be in accord with the miniaturization trend, and reduce the production observably. Further, the second contact portion 33, 33' of the switch 3, 3' is under the first contact portion 21, 21' of the corresponding contact 2, 2', and above portions are separate from each other without a card inserted in the receiving room 10, and touch each other when a card is inserted into the receiving room 10; therefore, the elasticity of the first and second contact portions is enough, and the process of inserting the card could not damage the switch terminal 3 having an opposite extending direction to the card insertion direction.

It is to be understood, however, that even though numerous, characteristics and advantages of the present invention have been set fourth in the foregoing description, together with details of the structure and function of the invention, the disclosed is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector, comprising:
an insulative housing having a supporting surface with a front end and a rear end;
a plurality of contacts assembled in the housing and oriented toward the rear end, each contact having at least a contact engaging portion extending above the supporting surface;
a switch terminal arranged in the rear end; and
one of the contact engaging portions engaged with the switch terminal when a card is inserted, and electrically separated from each other when the card is removed; wherein
the switch terminal has a second contact portion extending toward the rear end and under the corresponding contact engaging portion; wherein
an opening is formed on the front end of the housing; wherein
a receiving room extends from the opening toward the rear end, and the supporting surface is bottom of the receiving room; wherein
the switch terminal comprises an assembling portion assembled to the rear end of the housing, a soldering portion extending from one end of the assembling portion and protruding out of the housing, and the second contacting portion extending from the other end of the assembling portion and protruding into the receiving room.

2. An electrical card connector assembly comprising:
an insulative housing defining a card receiving space;
a plurality of contacts disposed in the housing with deflectable contacting sections extending into the card receiving space for engagement with an electronic card, and solder sections for mounting to a printed circuit board;
a switch terminal disposed in the housing and having a contacting portion corresponding to a selected one of said contacts, and a solder tail for mounting to said printed circuit board; and
an electronic card fully inserted into the card receiving space and defecting the corresponding contacting sections with circuit pads electrically and mechanically connected to the corresponding contacting sections; wherein
the contacting portion and the contacting section of said selected one of the contacts are separated from each other without electrical connection therebetween before said electronic card is inserted into the card receiving space, while said contacting portion is mechanically and electrically connected to said selected one of said contacts after said electronic card is fully inserted into the card receiving space, and wherein
said contacting portion and the contacting section of the selected one of the contacts are essentially aligned with each other in a front-to-back direction; wherein
said selected one of the contacts is located between others of the contacts in a transverse direction perpendicular to said front-to-back direction, and essentially located forwardly offset from all the others in said front-to-back direction.

3. The electrical card connector assembly as claimed in claim 2, wherein said contacting portion is directly forcibly deflected by the contacting section of the selected one of said contacts for electrical and mechanical connection therebetween when said electronic card is fully inserted into the card receiving space.

4. The electrical card connector assembly as claimed in claim 2, wherein said contacting portion is directly forcibly deflected by a spring arm of said selected one of the contacts under a condition that said spring aim is not directly electrically and mechanically connected to the corresponding circuit pad but deflected by a front edge of the inserted card.

5. The electrical card connector assembly as claimed in claim 4, wherein said spring arm is parallel to the corresponding contacting section of the selected one of the contacts.

6. The electrical card connector assembly as claimed in claim 1, wherein the switch terminal is located behind the selected one of the contacts.

7. The electrical card connector assembly as claimed in claim 2, wherein the contacting portion and the solder tail of the switch terminal extend oppositely from each other.

8. The electrical card connector assembly as claimed in claim 7, wherein the selected one of the contacts forms a spring arm beside the contacting section and wherein distal end of the spring arm of the selected one of the contacts and the contacting portion of the switch are positioned between the solder tail of the switch terminal and the contacting section of the selected one of the contacts along the card insertion direction.

9. The electrical card connector assembly as claimed in claim 2, wherein in each of the contacts, the solder section is located in front of the contacting section under condition that both the contacting section of the selected one of the contacts is essentially in front of the contacting sections of all the others, and the solder section of the selected one of the contacts is essentially in front of the solder sections of all the others.

10. An electrical card connector for use with an electronic card, comprising:
   an insulative housing defining a card receiving space;
   a plurality of contacts disposed in housing with tail sections for mounting to a printed circuit board and deflectable contacting sections extending into the receiving space for mechanically and electrically connecting to corresponding circuit pads of an inserted electronic card; and
   a switch terminal disposed in the housing and behind a selected one of the contacts; wherein
   said switch is not mechanically and electrically connected to said selected one of the contacts when the electronic card is not inserted into the receiving space while is mechanically and electrically connected to said selected one of the contacts when the electronic card is fully inserted into the card receiving space under a condition that the contacting section of said selected one of the contacts is mechanically and electrically connected to the corresponding circuit pad of the inserted electronic card; wherein
   the selected one of the contacts further includes a spring arm which is discrete from the corresponding contacting section and directly engages with the switch terminal for performing electrical and mechanical connection between the selected one of the contacts and the switch when the electrical card is inserted, under condition that electrical and mechanical engagement between the selected one of the contacts and the electrical card via the corresponding contacting section occurs before the electrical and mechanical connection between the selected one of the contacts and the switch via said spring arm.

11. The electrical card connector assembly as claimed in claim 10, wherein said selected one of the contacts is located between others of the contacts in a transverse direction, and essentially located forwardly offset from all the others in said front-to-back direction perpendicular to said transverse direction.

12. The electrical card connector assembly as claimed in claim 11, wherein in each of the contacts, the solder section is located in front of the contacting section under condition that both the contacting section of the selected one of the contacts is essentially in front of the contacting sections of all the others, and the solder section of the selected one of the contacts is essentially in front of the solder sections of all the others.

* * * * *